United States Patent [19]
Clowers

[11] Patent Number: 6,007,939
[45] Date of Patent: Dec. 28, 1999

[54] BATTERY PACK FOR CORDLESS TOOLS

[75] Inventor: Earl G. Clowers, Jackson, Tenn.

[73] Assignee: Porter-Cable Corporation, Jackson, Tenn.

[21] Appl. No.: 08/886,387

[22] Filed: Jul. 1, 1997

[51] Int. Cl.[6] .................................................... H01M 2/10
[52] U.S. Cl. ............................................ 429/99; 429/100
[58] Field of Search ...................................... 429/99, 100

[56] References Cited

PUBLICATIONS

"1995 Tools On Sale", p. 10, Models Makita 6211DW and Makita 6311DW No month.
"1995 Tools On Sale", p. 11, Models Porter Cable 9840, Porter Cable 9853 and Hitachi D10DFK No month.
"1995 Tools On Sale", p. 12, Model Ryobi TFD 222VRK No month.
"1995 Tools On Sale", p. 13, Model Milwaukee 0406–1 No month.
"1995 Tools On Sale", p. 14, Model Milwaukee 0422–1 No month.
"1995 Tools On Sale", p. 15, Model Bosch 3053VSRK No month.
"1995 Tools On Sale", p. 16, Model AEG ABSE15S No month.
"1995 Tools On Sale", p. 17, DEWALT Models DW944K–2, DW962K–2, DW952K, DW967K, DW945K–2, DW953K, and DW972K–2 No Month.
"1995 Tools On Sale", p. 18, DEWALT Models DW979K, DW976K, DW977K, DW978K, DW991K, and DW996K No month.
"1995 Tools On Sale", p. 19, Panasonic Model EY62821DKW No month.
"1995 Tools On Sale", p. 20, Panasonic Models EY6100CRKW, EY6100EQK, EY6100CQKW, EY6205EQK, and EY6207EQK No month.
"DeWALT High Performance Industrial Tools & Accessories", 1995 Power Tools & Accessories Catalog, p. 6, DeWALT Model DW942R No month.
"DeWALT High Performance Industrial Tools & Accessories", 1995 Power Tools & Accessories Catalog, p. 7, DeWALT Model DW961K–2 No month.
"DeWALT High Performance Industrial Tools & Accessories", 1995 Power Tools & Accessories Catalog, p. 8, DeWALT Models DW964K–2 and DW971K–2 No month.
"DeWALT High Performance Industrial Tools & Accessories", 1995 Power Tools & Accessories Catalog, p. 9, DeWALT Model DW974KQ No month.
"DeWALT High Performance Industrial Tools & Accessories", 1995 Power Tools & Accessories Catalog, p. 10, DeWALT Models DW994KQ and DW967K No month.
"DeWALT High Performance Industrial Tools & Accessories", 1995 Power Tools & Accessories Catalog, pp. 15–16, showing battery pack models DW9046, DW9048, DW9050, DW9051, DW9060, DW9070, DW9061, DW9071, and DW9091 No month.
Exhibit 1: Photographs illustrating Internal Components of DeWALT battery pack model 9071 (No date).
Freud® General Products Catalog, front outer and inner cover and p. 244 (1995) No month.

(List continued on next page.)

*Primary Examiner*—John S. Maples
*Attorney, Agent, or Firm*—Merchant & Gould P.C.

[57] ABSTRACT

The present invention relates to a battery pack including a housing adapted for being connected to a cordless power tool. A plurality of lower battery cells are positioned within the housing and electrically connected in series with one another. An upper battery cell is stacked on a first of the lower battery cells and is electrically connected in series with the plurality of lower battery cells. An insulator cap is positioned at the top end of the upper battery cell. The battery pack also includes a first conductive strip electrically connected to a second of the lower battery cells. The first conductive strip extends completely from the second of the lower battery cells to the insulator cap and forms a first electrical contact of a connector that is located at the insulator cap.

22 Claims, 5 Drawing Sheets

OTHER PUBLICATIONS

Makita General Catalog, 1996–1997, front cover and p. 27 No month.
Ryobi® Power Tools Outdoor Power Equipment Builders Hardware Catalog, Front and back Cover and p. 22 (1995) No month.
Skil® Heavy Duty Power Tools & Accessories, Front and back covers, p. 15 and p. 64 (1995) No month.

BATTERY PACK FOR CORDLESS TOOLS

FIELD OF THE INVENTION

The present invention relates generally to power sources such as battery packs. More particularly, the present invention relates to battery packs for use with cordless power tools.

BACKGROUND

Cordless power tools have become increasingly more popular. One reason for the increase in popularity relates to improvements which have been made with respect to battery pack designs. Contemporary battery packs provide cordless power tools with power capabilities that rival corded models. Additionally, contemporary battery packs typically can be used for extended periods without requiring recharging.

A variety of concerns relate to the manufacture of battery packs. Once concern relates to maximizing manufacturing and assembly efficiency. Another concern relates to reducing manufacturing costs. A further concern relates to providing battery packs that are durable.

SUMMARY

The present invention relates to a battery pack including a housing adapted for being connected to a cordless power tool. A plurality of lower battery cells are positioned within the housing and electrically connected in series with one another. An upper battery cell is stacked on a first of the lower battery cells and is electrically connected in series with the plurality of lower battery cells. An insulator cap is positioned at the top end of the upper battery cell. The battery pack also includes a first conductive strip electrically connected to a second of the lower battery cells. The first conductive strip extends completely from the second of the lower battery cells to the insulator cap and forms a first electrical contact of a connector that is located at the insulator cap. In one embodiment of the present invention, the first metal strip has a generally rectangular cross-section.

Another aspect of the present invention relates to a method for manufacturing a battery pack. The method includes the step of providing a plurality of lower battery cells. The method also includes the steps of stacking an upper battery cell on a first of the lower battery cells, and placing an insulator cap at a top end of the upper battery cell. The method further includes the steps of providing a single continuous conductive strip having first and second ends, and forming an electrical contact on the insulator cap with the first end of the conductive strip. The method additionally includes the step of electrically connecting the second end of the conductive strip to a second of the lower battery cells.

The present invention provide numerous advantages over the prior art. As opposed to a standard wire, the conductive strip of the present invention can be used to both form an electrical contact at the top of the upper battery cell, and provide a direct electrical connection between the electrical contact and one of the lower battery cells. Such a configuration improves manufacturing efficiency because the conductive strip can be welded directly to the lower battery cell without requiring any intermediate connecting elements. Additionally, because the conductive strip itself forms the electrical contact located at the top of the upper battery cell, no weldment or other type of separate connection is required at the insulator cap. Additionally, the configuration of the conductive strip is conducive for mechanically supporting and stabilizing the upper battery cell relative to the lower battery cells, and also functions to retain the insulator cap on the top of the upper battery cell.

A variety of additional advantages of the invention will be set forth in part in the description which follows, and in part will be apparent from the description, or may be learned by practicing the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
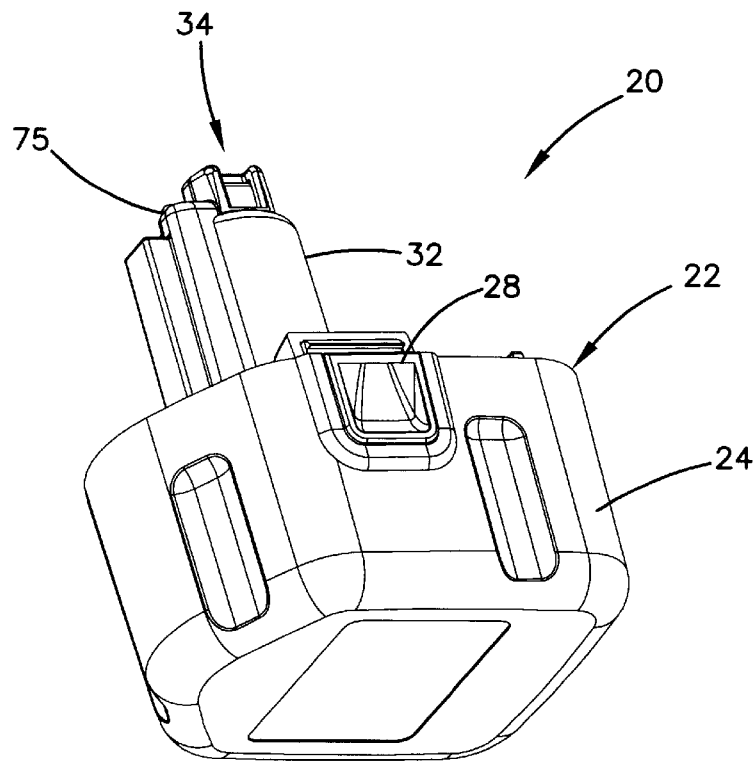
FIG. 1 is a bottom perspective view of a battery pack constructed in accordance with the principles of the present invention.
Figure 2:
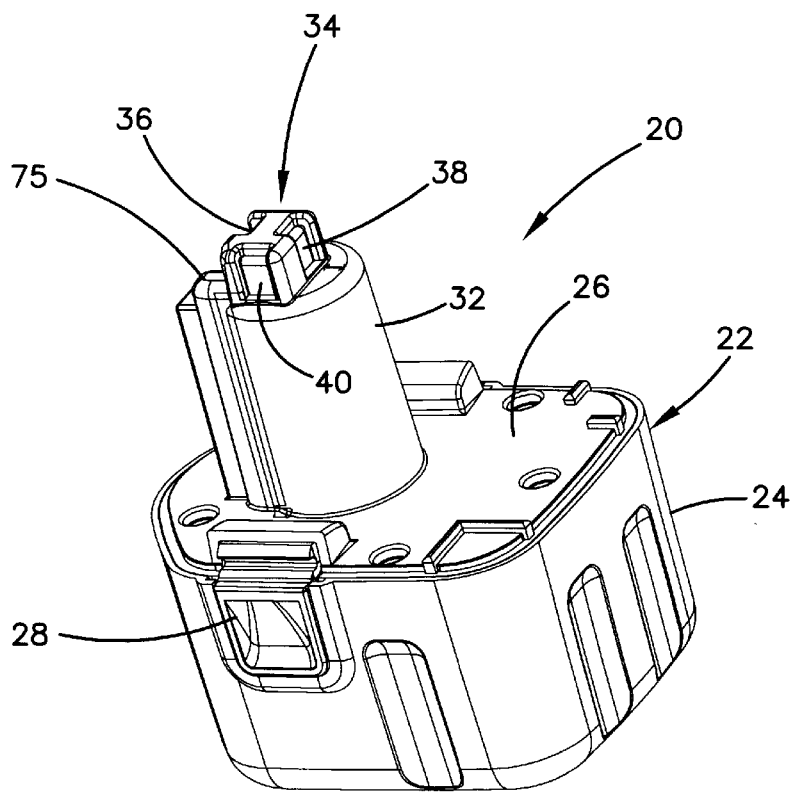
FIG. 2 is a top perspective view of the battery pack of FIG. 1.
Figure 3:
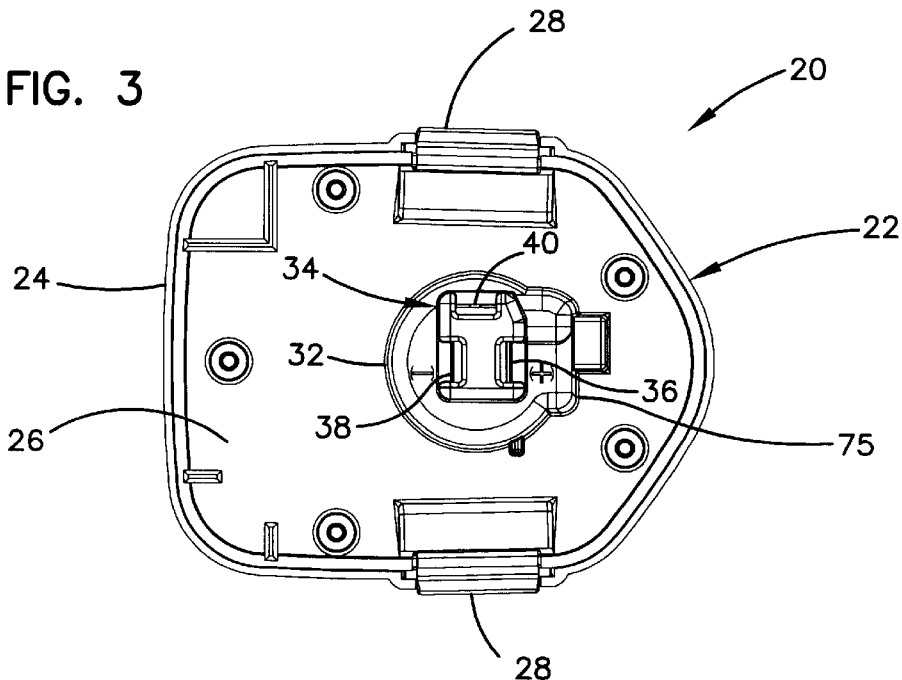
FIG. 3 is a top plan view of the battery pack of FIG. 1.
Figure 4:
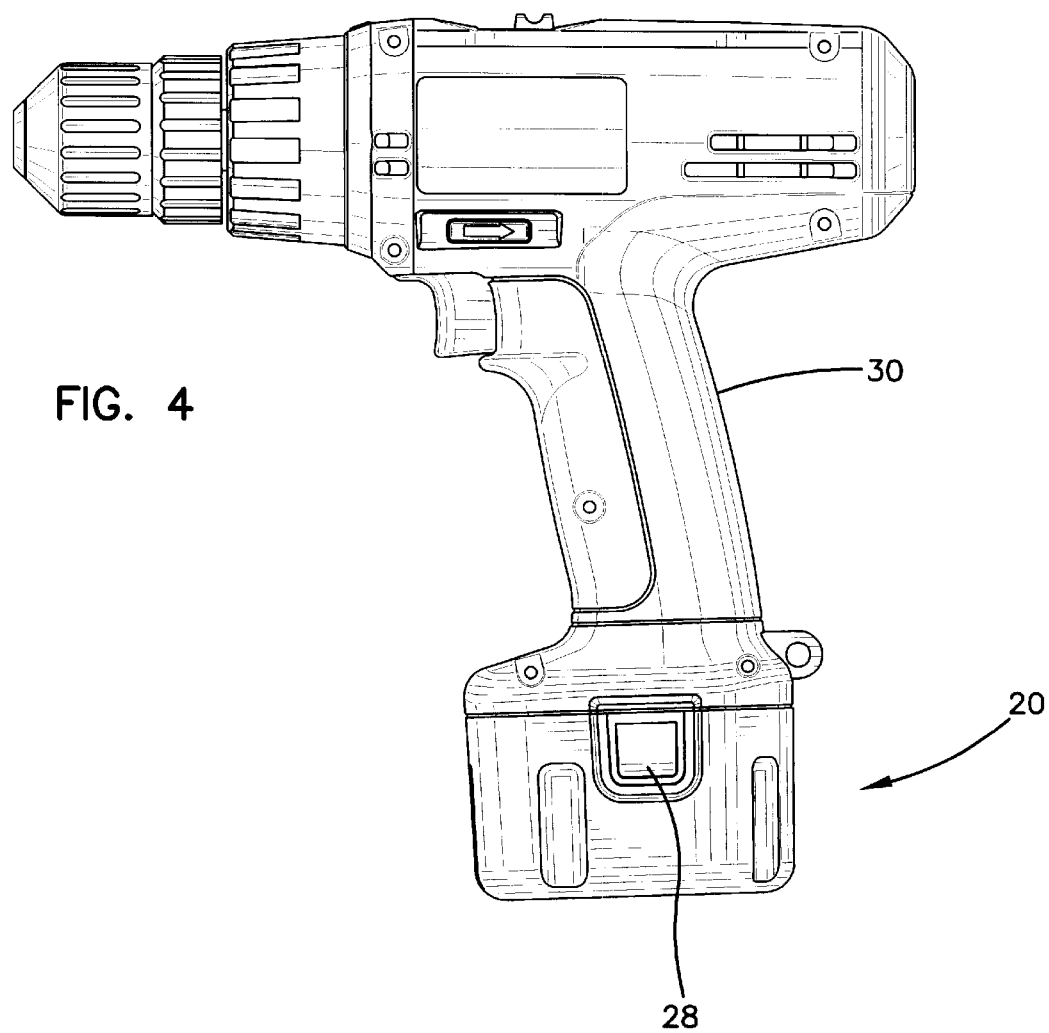
FIG. 4 is an elevational view of the battery pack of FIG. 1 shown in connection with a cordless drill.

FIGS. 1–3 illustrate the exterior features of a battery pack 20 constructed in accordance with the principles of the present invention. The battery pack 20 includes a housing 22 having a base portion 24 and a top cover 26. The housing 22 is also equipped with spring-loaded tabs 28 configured for fastening the battery pack 20 to a power tool such as the cordless drill 30 shown in FIG. 4.

The top cover 26 of the housing includes a tower portion 32 that projects outward from the top of the top cover 26 and is adapted to be received in a corresponding opening defined by a cordless power tool. A connector 34 is located at the top of the tower portion 32. The connector 34 includes a positive electrical contact 36 and a negative electrical contact 38. The electrical contacts 36, 38 are adapted to provide an electrical connection between the battery pack 20 and a corresponding power tool. The electrical contacts 36, 38 are also adapted to provide an electrical connection between a battery recharger (not shown) and the battery pack 20.

The connector 34 also includes a thermister contact 40 that is electrically connected to a thermister (not shown) located within the battery pack 20. When the battery pack 20 is being recharged, the recharger preferably monitors, via resistance data generated by the thermister, the temperature of the battery pack 20. The charger preferably is equipped with circuitry for automatically terminating the charging process if the battery pack 20 temperature departs from a predetermined temperature range.

Figure 5:
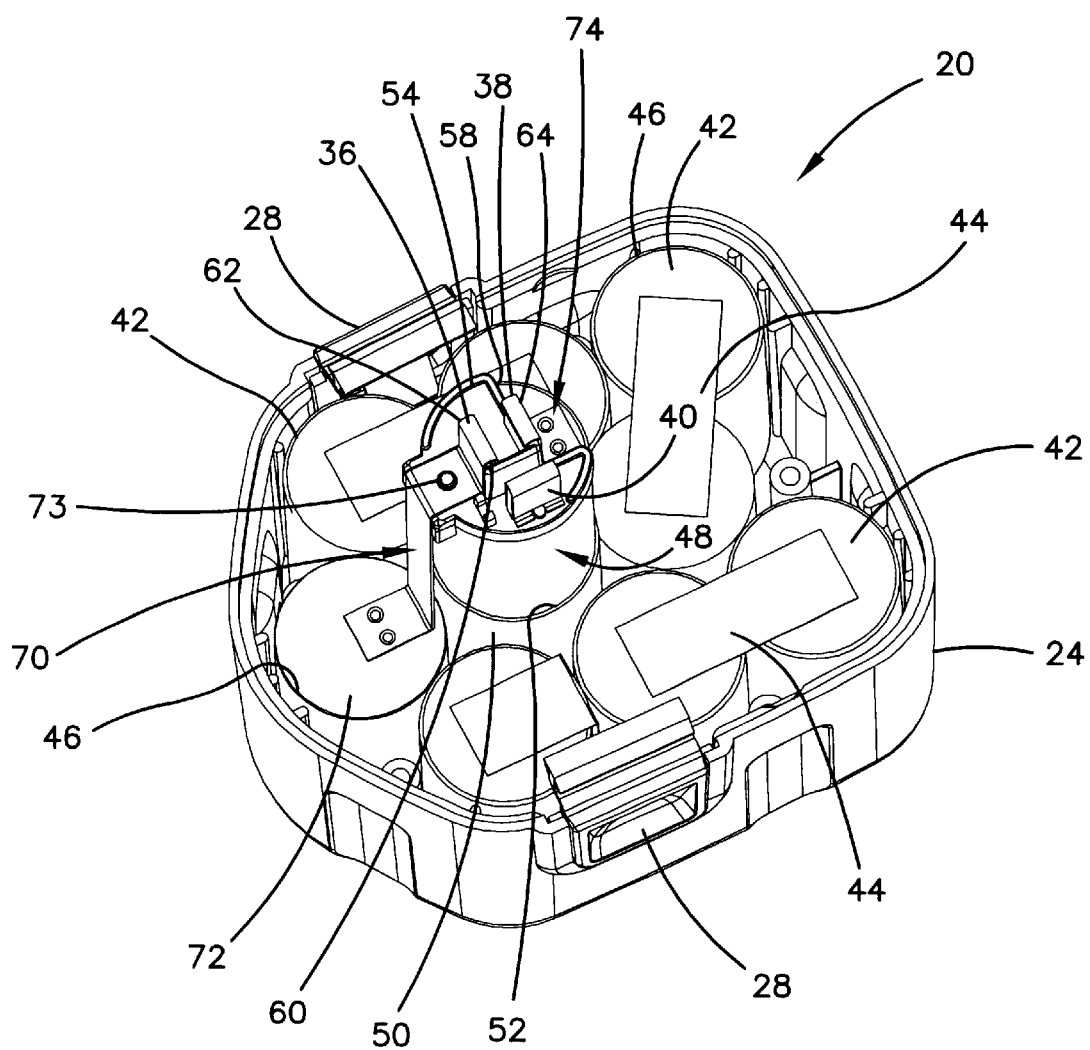
FIG. 5 is a perspective view of the battery pack of FIG. 1 with the top cover removed to illustrate internal electrical components of the battery pack.
Figure 6:
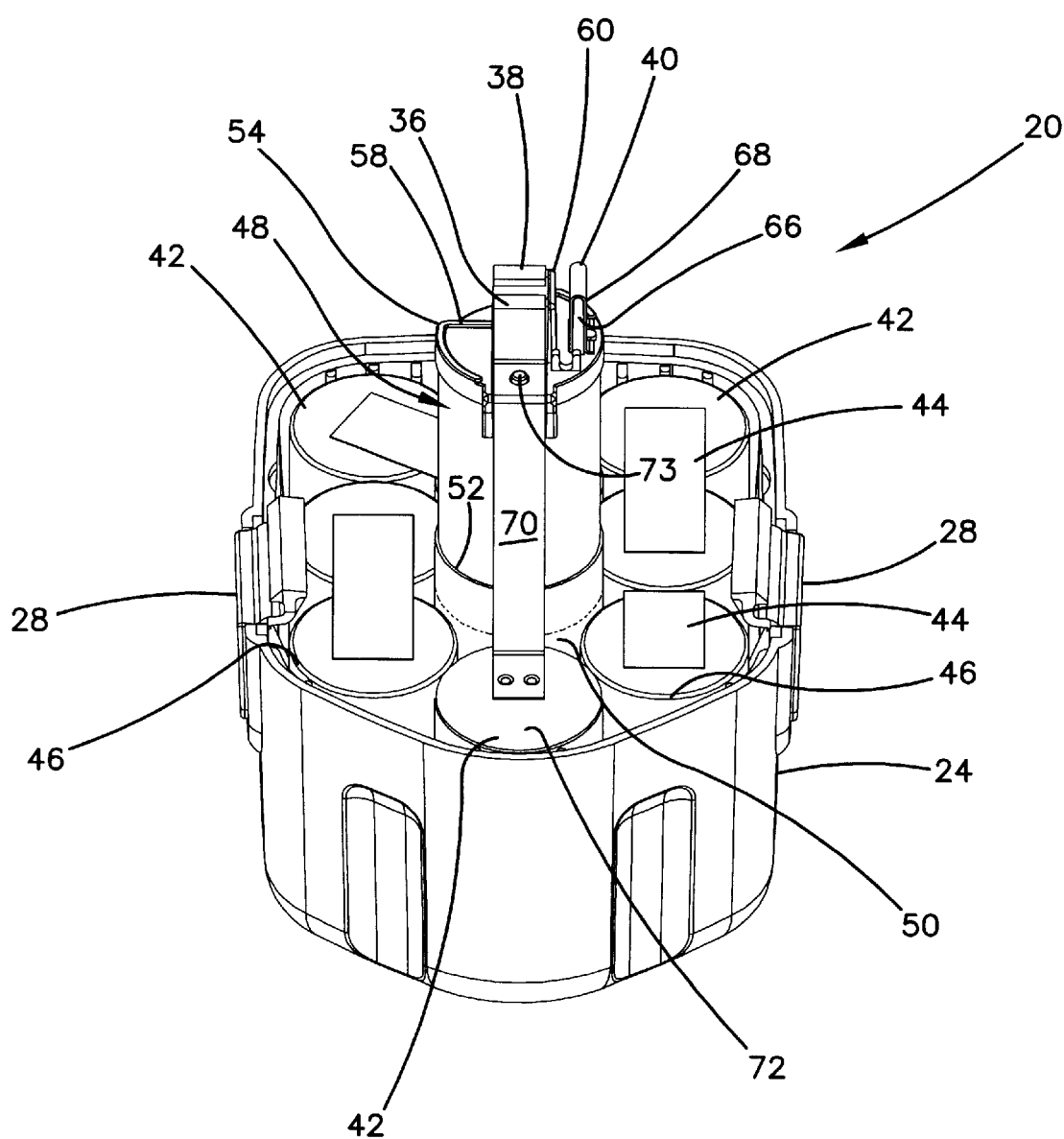
FIG. 6 is another perspective view of the battery pack of FIG. 1 with the top cover removed.
Figure 7:
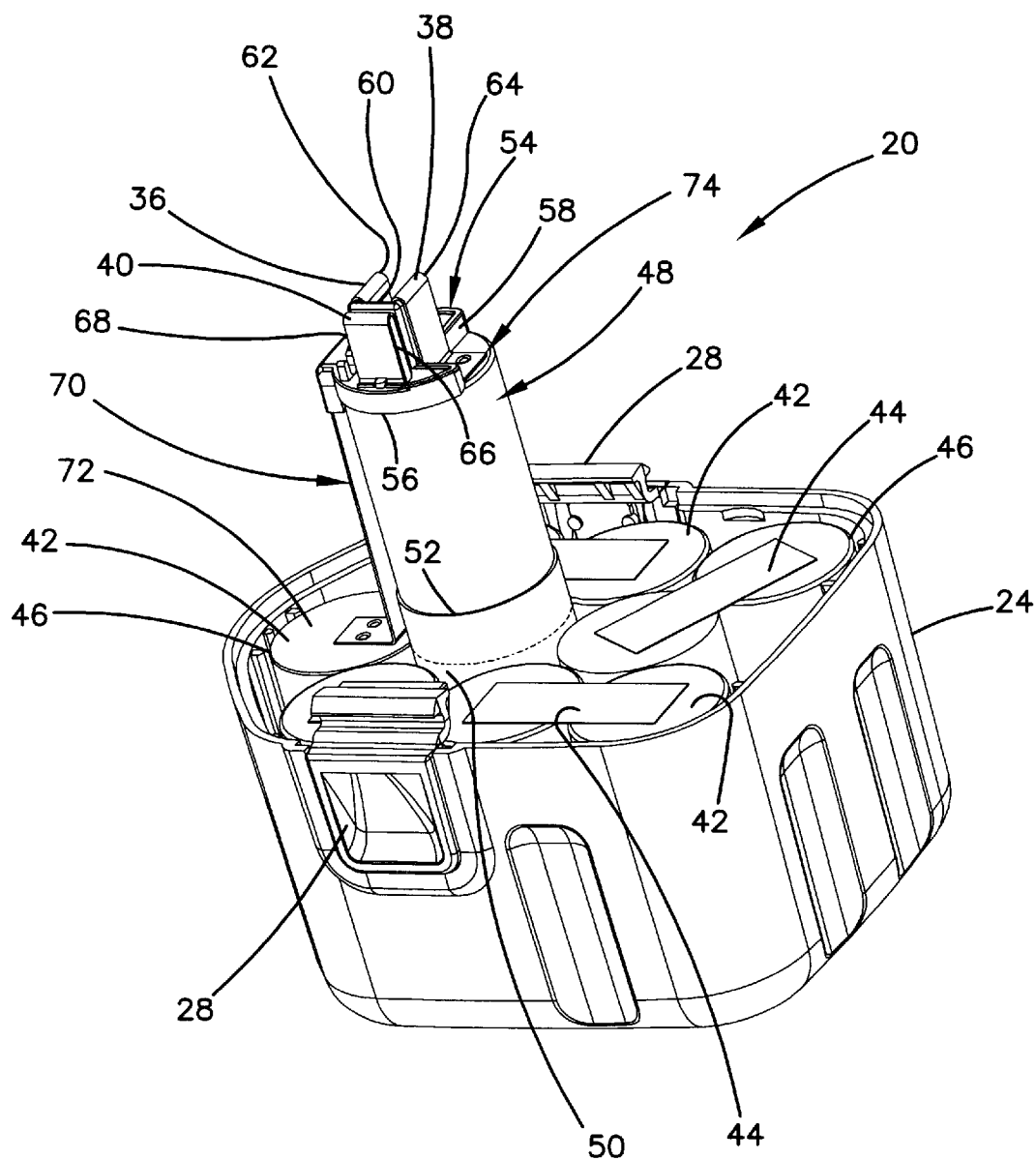
FIG. 7 is a further perspective view of the battery pack of FIG. 1 with the top cover removed.

FIGS. 5–7 show the battery pack 20 with the top cover 26 removed to reveal the inner electrical components of the battery pack. The inner components include a plurality of lower battery cells 42, such as nickel-cadmium cells, that are connected in series with one another by conductive strips 44. The lower battery cells 42 are positioned within the base portion 24 of the housing 22 and are separated from one another by cylindrical insulating sleeves 46. An upper battery cell 48 is stacked on a first lower battery cell 50 (shown in phantom line) and is electrically connected in series with the entire plurality of lower battery cells 42. The first lower battery cell 50 and upper battery cell 48 are generally co-axially aligned and are mounted in a common insulating sleeve 52 which facilitates in maintaining the co-axial alignment between the cells. The upper battery cell 48 and the first lower battery cell 50 are preferably in direct electrical connection with one another via a conductive strip positioned therebetween.

An insulator cap 54 is positioned on the top of the upper battery cell 48. The insulator cap 54 includes a flange 56 extending at least partially around a circumference of the top end of the upper battery cell 48. The flange 56 overlaps the top end of the upper battery cell 48 to maintain alignment of the insulator cap 54 with respect to the top of the cell 48. The insulator cap 54 also includes a cutaway portion 58 configured to leave a portion of the top side of the upper battery cell 48 exposed.

The insulator cap 54 also includes an integrally formed U-shaped projection 60 that projects axially outward from the top end of the upper battery cell 48. The U-shaped projection 60 includes opposing first and second legs 62, 64. The insulator cap 54 further includes an integrally formed projection 66 which is spaced from the U-shaped projection 60.

The thermister contact 40 of the connector 34 is formed by a conductive member 68 that is secured to the projection 66. A wire (not shown) is used to connect the conductive member 68 to a thermister (not shown) which is secured to the portion of the insulating sleeve 52 that surrounds the first lower battery cell 50.

The positive electrical contact 36 of the connector 34 is formed by a first conductive strip 70 which has a first end that extends over the first leg 62 of the U-shaped projection 60. The first conductive strip 70 preferably has a rectangular cross-section and preferably is made of an uninsulated copper alloy. The first conductive strip 70 extends completely and continuously from the insulator cap 54 to a second lower battery cell 72. A second end of the first conductive strip 70 is preferably welded directly to the top positive side of the second lower battery cell 72. It is preferred for weld projections to be utilized to focus the weld.

The first conductive strip 70 is preferably bent in predetermined configuration to facilitate providing an electrical connection with the second lower battery 72, and to provide a mechanical connection with the insulator cap 54. For example, the first end of the conductive strip 70 is bent in a curved configuration which is hooked around the top of the first leg 62. At the base of the first leg 62, the first conductive strip 70 is bent at a substantial right angle such that a portion extends along the top surface of the insulator cap 54. At the periphery of the insulator cap 54, the first conductive strip 70 is bent at another substantial right angle such that a portion of the first conductive strip 70 extends downward in a direction generally parallel to the upper battery cell 48. Adjacent the top of the second lower battery cell 72, the first conductive strip 70 is bent at a further substantial right angle to facilitate connecting the second end of the first conductive strip 70 to the top of the second lower battery cell 72.

Referring to FIG. 6, the first strip 70 is also secured to the insulator cap 56 by a cylindrical tab 73 that projects upward from the cap 56 and that extends through an aperture defined by the first strip 70. Additionally, the first conductive strip 70 is arranged to fit within a longitudinal channel 75 defined by the tower portion 32 of the top cover 26.

The negative electrical contact 38 of the connector 34 is formed by a second conductive strip 74 that has a first end hooked over the second leg 64 of the U-shaped projection 60. A second end of the conductive strip is connected, by means such as a weldment, directly to the top side of the upper battery cell 48. Access to the top side of the upper battery cell 48 is provided by the cutaway portion 58 of the insulator cap 54.

The first and second conductive strips 70, 74 cooperate to mechanically retain the insulator cap 54 on the top of the upper battery cell 48. Additionally, the first conductive strip 70 functions to mechanically stabilize the upper battery cell 48 relative to the lower battery cells 42.

It will be appreciated that the battery pack can be equipped with a variety of voltage capacities. Exemplary voltage capacities include 9.6 volts, 12 volts and 14.4 volts.

Another aspect of the present invention relates to a method for assembling the battery pack 20. The method includes the step of connecting the plurality of lower battery cells 42 in series. Next, the upper battery cell 48 is positioned above and electrically connected to the first lower battery cell 50. The insulator cap 54 is then placed at the top end of the upper battery cell 48. The negative contact 38 of the connector 34 is formed by hooking the first end of the second conductive strip 74 over the second leg 64 and welding the second end of the second conductive strip 74 directly to the top of the upper battery cell 48. The positive contact 36 of the connector 34 is formed by hooking the first end of the first conductive strip 70 over the first leg 62 and welding the second end of the first conductive strip 70 to the top of the second lower battery cell 72. As the first strip 70 is hooked over the first leg 62, the cylindrical tab 73 fits within the corresponding aperture defined by the first strip 70. The thermister contact 40 is formed by placing the conductive member 68 over the projection 66 of the insulating cap 56. The thermister, which is electrically connected to the conductive member 68, is then secured by means such as aluminum tape to the portion of the insulating sleeve 52 that surrounds the first lower battery cell 50.

After the above electrical connections have been completed, the lower battery cells 42 are placed in the base portion 34 of the housing 22. Finally, the top cover 26 is placed over the base portion 24 such the upper battery cell 48 is received within the tower portion 32 and the first conductive strip 70 is received within the channel 75 of the tower portion 32.

With regard to the foregoing description, it is to be understood that changes may be made in detail, especially in matters of the construction material employed and the shape, size and arrangement of the parts without departing from the scope of the present invention. It is intended that the specification and the depicted aspects of the invention may be considered exemplary only, with a true scope and spirit of the invention being indicated by the broad meaning of the following claims.

We claim:

1. A battery pack comprising:
   a housing;
   a plurality of lower battery cells positioned within the housing and electrically connected in series with one another;
   an upper battery cell positioned above the lower battery cells and electrically connected in series with the plurality of lower battery cells;
   an insulator cap positioned at a top end of the upper battery cell;
   a first conductive strip electrically connected to a selected one of the lower battery cells, the first conductive strip extending completely from a top end of the selected one of the lower battery cells to the insulator cap, the first conductive strip being arranged and configured to mechanically stabilize the upper battery cell relative to the lower battery cells; and
   a second conductive strip electrically connected to the upper battery cell, the first and second conductive strips being constructed and arranged to form a connector located at the insulator cap.

2. The battery pack of claim 1, wherein the insulator cap includes opposing first and second members that extend axially outward from the top end of the upper battery cell, and the connector includes portions of the first and second conductive strips that are respectively bent over the first and second members.

3. The battery pack of claim 1, wherein the first and second conductive strips cooperate to retain the insulator cap on the upper battery cell.

4. The battery pack of claim 1, wherein the first conductive strip comprises an uninsulated copper strip.

5. The battery pack of claim 1, wherein the second conductive strip is welded to the top end of the upper battery cell, and the insulator cap includes a cut-away portion for providing access to the top end of the upper battery cell.

6. The battery pack of claim 1, wherein the insulator cap includes a flange extending at least partially around a circumference of the top end of the upper battery cell.

7. The battery pack of claim 1, wherein the first conductive strip is welded directly to the selected one of the lower batteries.

8. The battery pack of claim 1, wherein the housing includes a tower portion adapted to cover the upper battery cell, the tower portion defining a channel extending in a direction along a length of the tower portion, the channel being arranged and configured to receive the first conductive strip.

9. The battery pack of claim 1, further comprising a cordless power tool connected to the battery pack.

10. The battery pack of claim 9, wherein the cordless power tool comprises a drill.

11. The battery pack of claim 1, wherein the first conductive strip comprises a substantially flat copper strip which is bent at predetermined locations to facilitate providing an electrical connection with the selected one of the lower batteries, and to provide a mechanical connection with the insulator cap.

12. The battery pack of claim 1, wherein the first conductive strip has a substantially rectangular cross-section.

13. The battery pack of claim 1, wherein the upper battery cell is stacked directly above a selected other of the lower battery cells that is different from the selected one of the lower battery cells, the upper battery cell and the selected other of the lower battery cells being co-axially mounted within a common cylindrical insulator sleeve.

14. The battery pack of claim 13, wherein the upper battery cell is electrically connected directly to the selected other of the lower battery cells.

15. A battery pack comprising:
   a housing;
   a plurality of lower battery cells positioned within the housing and electrically connected in series with one another;
   an upper battery cell positioned above the lower battery cells and electrically connected in series with the plurality of lower battery cells;
   an insulator cap positioned at a top end of the upper battery cell, the insulator cap including at least one projection that extends axially outward from the top end of the upper battery cell; and
   a first conductive strip providing an electrical connection between the upper battery cell and a selected one of the lower battery cells, the first conductive strip including a main portion that extends from the selected one of the lower battery cells to the insulator cap, the first conductive strip also including a bent portion that is a single unitary piece with the main portion of the first conductive strip, wherein the bent portion is bent over the at least one projection of the insulator cap and forms a first electrical contact of a connector located at the insulator cap.

16. The battery pack of claim 15, further comprising a second conductive strip electrically connected to the upper battery cell, the second conductive strip forming a second contact of the connector.

17. The battery pack of claim 16, wherein the insulator cap includes opposing first and second projections that extend axially outward from the top end of the upper battery cell, and the first and second contacts of the connector are formed over the first and second projections.

18. The battery pack of claim 15, wherein the first conductive strip comprises a metal strip having a rectangular cross-section.

19. A battery pack comprising:
   a housing;
   a plurality of lower battery cells positioned within the housing and electrically connected in series with one another;
   an upper battery cell stacked on a first of the lower battery cells and electrically connected in series with the plurality of lower battery cells;
   an insulator cap positioned at a top end of the upper battery cell;
   a first conductive member providing an electrical connection between a second of the lower battery cells and an electrical contact located at the insulator cap; and
   wherein the upper battery cell and the first of the lower battery cells are co axially mounted within a common cylindrical insulator sleeve.

20. The battery pack of claim 19, wherein the first conductive member comprises a conductive strip.

21. The battery pack of claim 20, wherein the conductive strip is mechanically and electrically connected directly to a top end of the second of the lower battery cells, and includes a bent portion that forms an electrical contact at the insulator cap.

22. The battery pack of claim 19, wherein the first of the lower battery cells is electrically connected directly to the upper battery cell.

\* \* \* \* \*